(12) United States Patent
Crowl

(10) Patent No.: US 12,295,286 B1
(45) Date of Patent: *May 13, 2025

(54) ZERO-TURN-RADIUS RIDING MOWER ADJUSTABLE ARM SUPPORT SYSTEM

(71) Applicant: Bad Boy Mowers, LLC, Batesville, AR (US)

(72) Inventor: Zachary Crowl, Batesville, AR (US)

(73) Assignee: BAD BOY MOWERS, LLC, Batesville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,845

(22) Filed: Oct. 16, 2023

Related U.S. Application Data

(63) Continuation of application No. 16/576,104, filed on Sep. 19, 2019, now Pat. No. 11,825,766.

(51) Int. Cl.
*A01D 34/82* (2006.01)
*B60N 2/75* (2018.01)
*A01D 34/66* (2006.01)
*A01D 101/00* (2006.01)

(52) U.S. Cl.
CPC ........... *A01D 34/824* (2013.01); *B60N 2/767* (2018.02); *B60N 2/77* (2018.02); *A01D 34/66* (2013.01); *A01D 2101/00* (2013.01)

(58) Field of Classification Search
CPC .. A01D 34/66; A01D 34/824; A01D 2101/00; B60N 2/767; B60N 2/77
USPC .......................................... 296/1.09; 248/118
See application file for complete search history.

(56) References Cited

U.S. PATENT DOCUMENTS

| | | | | | |
|---|---|---|---|---|---|
| 1,706,634 | A | * | 3/1929 | Seils | G05G 1/62 128/877 |
| 1,892,048 | A | * | 12/1932 | Genung | B60N 2/767 248/118 |
| RE19,721 | E | * | 10/1935 | Genung | B60N 2/78 297/411.36 |
| 2,119,325 | A | * | 5/1938 | Goodhart | A61M 5/52 248/118 |
| 2,491,009 | A | * | 12/1949 | Lawrence | B60N 2/787 224/558 |

(Continued)

FOREIGN PATENT DOCUMENTS

KR 102047770 B1 11/2019

OTHER PUBLICATIONS

Spartan; "Installation Instructions: Arm Rest" retrieved on Sep. 11, 2019 from: https://static.visionamp.org/rubix/20190327/9d9380affe8c81a60bedb1fee47ee6cbf5e1141e.pdf; pp. 1-2.

*Primary Examiner* — James M Ference
(74) *Attorney, Agent, or Firm* — Pillsbury Winthrop Shaw Pittman, LLP

(57) ABSTRACT

A riding mower arm rest system that includes an armrest clamp adapted to couple to a control handle of a zero-turn radius (ZTR) riding mower, a first armrest member rotatably coupled to the armrest clamp (where the first armrest member is adapted to rotate about a first rotational axis oriented transverse to a longitudinal axis of the control handle), a second armrest member rotatably coupled to the first armrest member (where the second rotatable armrest member is adapted to rotate about a second rotational axis oriented transverse to the first rotational axis), and an armrest coupled to the second armrest member.

30 Claims, 6 Drawing Sheets

(56) References Cited

U.S. PATENT DOCUMENTS

| | | | | |
|---|---|---|---|---|
| 2,614,558 A | * | 10/1952 | Lovell | A61F 5/04 248/118 |
| 2,642,250 A | * | 6/1953 | Kasnowich | A61G 13/12 248/214 |
| 3,124,328 A | * | 3/1964 | Kortsch | A61G 15/12 248/278.1 |
| 3,614,085 A | * | 10/1971 | Cunningham | A61G 5/125 297/161 |
| 4,277,102 A | * | 7/1981 | Aaras | A47C 1/03 D6/365 |
| 4,559,669 A | | 12/1985 | Bonzer et al. | |
| 4,695,096 A | * | 9/1987 | Kincaid | B62J 1/28 297/411.31 |
| 4,913,393 A | * | 4/1990 | Wood | A61G 5/10 248/283.1 |
| 4,997,054 A | * | 3/1991 | Denny | B60N 2/77 248/118 |
| 5,029,941 A | * | 7/1991 | Twisselmann | A61B 90/60 297/344.13 |
| 5,074,501 A | * | 12/1991 | Holtta | B43L 15/00 248/281.11 |
| 5,281,001 A | * | 1/1994 | Bergsten | A47C 1/0308 248/118 |
| 5,369,805 A | * | 12/1994 | Bergsten | A47C 7/546 297/411.36 |
| 5,380,065 A | * | 1/1995 | Rohrer | A47C 1/0308 297/411.37 |
| 5,407,249 A | * | 4/1995 | Bonutti | A47C 16/00 297/411.35 |
| 5,653,499 A | * | 8/1997 | Goodall | A47B 83/02 297/173 |
| 5,713,591 A | * | 2/1998 | Zarkhin | A61G 5/127 280/291 |
| 5,884,974 A | * | 3/1999 | Bergsten | A47B 21/0371 297/411.36 |
| 6,022,079 A | * | 2/2000 | Bergsten | A47C 1/03 297/411.36 |
| 6,042,064 A | * | 3/2000 | Hong | A47B 21/0371 248/278.1 |
| 6,045,179 A | * | 4/2000 | Harrison | A47B 83/02 297/188.21 |
| 6,185,920 B1 | * | 2/2001 | Oxley | B62D 51/02 56/14.7 |
| 6,271,452 B1 | * | 8/2001 | Bernard | G09B 15/00 84/453 |
| 6,520,587 B2 | * | 2/2003 | Noiseux | A61G 15/12 297/411.39 |
| 6,619,598 B2 | * | 9/2003 | De Miranda | A61B 90/60 248/118.3 |
| 6,619,747 B2 | * | 9/2003 | Ko | A47C 9/025 297/411.31 |
| 6,663,055 B2 | * | 12/2003 | Boucher | A61G 13/0045 248/118 |
| 6,702,373 B2 | * | 3/2004 | Rossko | A47C 7/68 297/173 |
| 6,736,357 B2 | * | 5/2004 | Venn | F16H 59/0278 248/118 |
| 6,923,505 B2 | * | 8/2005 | Siminovitch | A47C 7/54 297/411.39 |
| 7,055,910 B2 | * | 6/2006 | Wright | A61G 13/12 403/90 |
| D526,952 S | * | 8/2006 | Stahel | D12/411 |
| D555,047 S | * | 11/2007 | Colbert | D12/119 |
| 7,426,976 B2 | * | 9/2008 | Edlin | A01D 34/64 280/778 |
| D588,613 S | * | 3/2009 | Schroeder | D15/28 |
| 7,726,732 B1 | * | 6/2010 | Keating | A47C 7/705 297/161 |
| 8,083,247 B2 | * | 12/2011 | Lee | B62J 29/00 280/288.4 |
| 8,528,444 B1 | * | 9/2013 | Gubin | A01D 34/824 74/543 |
| 8,607,901 B1 | * | 12/2013 | Depauw | A01D 34/82 180/6.48 |
| D778,961 S | * | 2/2017 | Foster | D15/28 |
| 10,321,627 B1 | * | 6/2019 | Lapp | G05G 1/04 |
| 10,806,650 B2 | * | 10/2020 | Di Lauro | A61M 5/52 |
| 11,343,964 B1 | * | 5/2022 | Covington | A01D 34/82 |
| 11,825,766 B1 | * | 11/2023 | Crowl | B60N 2/767 |
| 2003/0106297 A1 | * | 6/2003 | Melone | A01D 34/64 56/15.8 |
| 2005/0052066 A1 | * | 3/2005 | Wright | A61G 13/12 297/411.36 |
| 2006/0202541 A1 | * | 9/2006 | Armo | B60N 2/797 297/411.35 |
| 2007/0096531 A1 | * | 5/2007 | Bruns | B60N 2/77 297/411.36 |
| 2007/0144133 A1 | * | 6/2007 | Drake | A01D 34/82 56/323 |
| 2008/0178568 A1 | * | 7/2008 | Edlin | A01D 34/64 56/10.8 |
| 2008/0264026 A1 | * | 10/2008 | Ishii | B60K 17/356 56/10.8 |
| 2010/0187889 A1 | * | 7/2010 | Bruns | B66F 9/0759 297/411.35 |
| 2012/0060640 A1 | * | 3/2012 | Buford | A01D 34/824 74/543 |
| 2012/0186887 A1 | * | 7/2012 | Moriguchi | B60L 58/15 180/65.1 |
| 2014/0173946 A1 | * | 6/2014 | Gerrits | E02F 9/16 56/14.7 |
| 2019/0239431 A1 | * | 8/2019 | Kastelic, Jr. | B62D 11/006 |

* cited by examiner

ZERO-TURN-RADIUS RIDING MOWER ADJUSTABLE ARM SUPPORT SYSTEM

RELATED APPLICATIONS

This application is a continuation of U.S. patent application Ser. No. 16/576,104, filed Sep. 19, 2019 and titled "Zero-Turn-Radius Riding Mower Adjustable Arm Support System", the entirety of which is hereby incorporated by reference.

FIELD

Embodiments relate generally to mowing devices and more particularly to riding mower arm support systems.

BACKGROUND

A lawn mower (or "mower") is often used to cut (or "mow") grassy areas. A mower typically utilizes one or more rotating cutting blades that cut grass as the mower travels across the ground. A mower often takes the form of a walk-behind mower or a riding mower (or "ride-on" mower). A walk-behind mower is typically designed to be operated by an operator that walks behind and guides the mower. Some walk-behind mowers rely on the operator pushing the mower for propulsion (often referred to as "push" mowers). Some walk-behind mowers have a drive system (or "propulsion" system) that assists in propelling the mower (often referred to as "self-propelled" walk-behind mowers). A riding mower is typically designed to be operated by an operator that rides on the mower as it travels across the ground and cuts grass. A riding mower normally includes an operator support, such as a seat or platform, and a drive system that propels the mower.

A zero-turn-radius (ZTR) riding mower is a particular type of riding mower. A ZTR riding mower is often identifiable by right and left control handles (or "control arms" or "drive arms" or "control levers" or "steering levers") that an operator can push or pull to drive respective right and left drive wheels forward or backward. This enables the mower to make sharp turns with ease, even spinning the entire mower in place—hence the label "zero-turn-radius." A ZTR riding mower is often desirable for its agility, speed, and wide mowing coverage. A ZTR mower typically employs drive units, such as hydrostatic (or "hydraulic") transaxles, that selectively rotate drive wheels forward or backward in response to pushing or pulling of the control handles.

ZTR mowers often take the form of sit-on ZTR mowers or stand-on ZTR mowers. A sit-on ZTR mower typically includes a seat and is designed to be operated with the operator seated in the seat. A stand-on ZTR mower typically includes a platform and is designed to be operated with the operator standing on the platform. An operator may prefer a sit-on ZTR mower over a stand-on ZTR mower, for example, for the comfort provided by mowing in a seated position. An operator may prefer a stand-on ZTR mower over a sit-on ZTR mower, for example, for its compact footprint, easy on-and-off access, and the visual perspective provided in the standing position.

SUMMARY

Although zero-turn-radius (ZTR) riding mowers can provide advantages over other types of mowers, they can have shortcomings. For example, like other types of riding mowers, ZTR riding mowers may be operated over rough terrain (e.g., including bumps, holes, or debris) for long periods of time, which can lead to operator fatigue. In some instances, operator fatigue manifests itself in the arms, wrists or hands of an operator. This can result from an operator continually manipulating the control handles of the mower and may be more prevalent for operators suffering from carpal tunnel syndrome or other issues with the arms, wrists or hands.

In view of these and other shortcomings, provided are embodiments of a ZTR riding mower arm support system (or "arm rest system"). In some embodiments, an arm rest system includes an arm support that can be attached to a control handle and support an operator's arm, wrist or hand while grasping or manipulating the control handle. For example, the arm rest system may include an arm support having a "clamp" that can be secured to an upper portion of a control handle (e.g., near a handle of the control handle) and a platform (or "pad") that can support the arm or wrist of an operator grasping the control handle. Such a configuration may enable the operator to rest the weight of her/his arm, wrist and hand on the arm support, which can help reduce operator fatigue and improve operator comfort. In some embodiments, the arm support is "adjustable." For example, the clamp used to secure the arm support may be adapted to move "up" and "down" along the control handle and to be swiveled "around" the control handle, and the pad may be coupled to the clamp in a manner that enables the pad to be tilted "forward," "backward," and "side-to-side" relative to the clamp and the control handle. Such adjustability may enable an operator to configure the pad in a position that is most comfortable to her/him. For example, an operator that prefers her/his hands to be level with an upper end of the control handle with her/his arms angled downward by about 15 degrees and her/his wrists angled inward at an angle of about 30 degrees may secure the clamp near the upper end of the control handle, and secure the pad such that it is tilted "backwards" at an angle of about 15 degrees and is tilted "sideways" at an angle of about 30 degrees. Accordingly, the adjustable nature of the arm support may allow an operator to "fine-tune" the arm support to her/his preferred position. In some embodiments, the clamp can be coupled to different styles of control handles. For example, the clamp may have an adjustable opening that can be secured about round control handles having different diameters. The adjustable nature of the clamp and the pad may enable the arm support to be used on a variety of mowers having different styles of control handles.

Provided in some embodiments is a ZTR riding mower arm rest system, that includes the following: an armrest clamp adapted to couple to a control handle of a zero-turn radius (ZTR) riding mower; a first armrest member rotatably coupled to the armrest clamp by way of a first fastener, where the first armrest member is adapted to rotate relative to the armrest clamp about a first rotational axis that is defined by a longitudinal axis of the first fastener and that is oriented transverse to a longitudinal axis of the control handle, and where the first fastener is adapted to be tightened to secure a position of the first armrest member relative to the armrest clamp; a second armrest member rotatably coupled to the first armrest member by way of a second fastener, where the second rotatable armrest member is adapted to rotate relative to the first armrest member about a second rotational axis that is defined by a longitudinal axis of the second fastener and that is oriented transverse to the first rotational axis, and where the second fastener is adapted to be tightened to secure a position of the second rotatable armrest relative to the first armrest member; and an armrest coupled to the second armrest member.

In some embodiments, the armrest clamp is adapted to move along a length of the control handle to provide for adjustment of positioning of the ZTR riding mower arm rest system on the control handle. In some embodiments, the armrest clamp includes: a first clamp body member; a second clamp body member; and a clamp body fastener, where the first clamp body member and the second clamp body member are adapted to be disposed on opposite sides of the control handle and to be secured to one another about the control handle by the clamp body fastener. In some embodiments, the first fastener includes a first male threaded member that is adapted to thread into a first female threaded hole to secure the position of the first armrest member relative to the armrest clamp. In some embodiments, the first threaded member includes a bolt and the first female threaded hole includes a female threaded hole in a body of the armrest clamp.cIn some embodiments, the first armrest member or the second armrest member includes an arc-shaped guide slot, and where rotation of the second armrest member relative to the first armrest member is guided by way of a guide member that is adapted to move along the guide slot.

Provided in some embodiments is a ZTR riding mower arm rest system that includes the following: a ZTR armrest clamp adapted to couple to a control handle of a ZTR riding mower; a first rotatable ZTR armrest member rotatably coupled to the ZTR armrest clamp, where the first rotatable ZTR armrest member is adapted to rotate relative to the ZTR armrest clamp about a first rotational axis oriented transverse to a longitudinal axis of the control handle; a second rotatable ZTR armrest member rotatably coupled to the first rotatable ZTR armrest member, where the second rotatable ZTR armrest member is adapted to rotate relative to the first rotatable ZTR armrest member about a second rotational axis oriented transverse to the first rotational axis; and a ZTR armrest pad coupled to the second rotatable ZTR armrest member.

In some embodiments, the ZTR armrest clamp is adapted to move along a length of the control handle to provide for adjustment of positioning of the ZTR riding mower arm rest system on the control handle. In some embodiments, the ZTR armrest clamp includes: a first clamp body member; a second clamp body member; and a clamp body fastener, where the first clamp body member and the second clamp body member are adapted to be disposed on opposite sides of the control handle and to be secured to one another about the control handle by the clamp body fastener. In some embodiments, the first rotatable ZTR armrest member is rotatably coupled to the ZTR armrest clamp by way of a first fastener, and where the first rotational axis is defined by a longitudinal axis of the first fastener. In some embodiments, the first fastener includes a first male threaded member that is adapted to thread into a first female threaded hole to secure the position of the first rotatable ZTR armrest member relative to the ZTR armrest clamp. In some embodiments, the first threaded member includes a bolt and the first female threaded hole includes a female threaded hole in a body of the ZTR armrest clamp. In some embodiments, the second rotatable ZTR armrest member is rotatably coupled to the first rotatable ZTR armrest member by way of a second fastener, and where the second rotational axis is defined by a longitudinal axis of the second fastener. In some embodiments, the first rotatable ZTR armrest member or the second rotatable ZTR armrest member includes an arc-shaped guide slot, and where rotation of the second rotatable ZTR armrest member relative to the first rotatable ZTR armrest member is guided by way of a guide member that is adapted to move along the guide slot.

Provided in some embodiments is a riding mower arm rest system that includes the following: an armrest clamp adapted to couple to a control handle of a zero-turn radius (ZTR) riding mower; a first armrest member rotatably coupled to the armrest clamp, where the first armrest member is adapted to rotate about a first rotational axis oriented transverse to a longitudinal axis of the control handle; a second armrest member rotatably coupled to the first armrest member, where the second rotatable armrest member is adapted to rotate about a second rotational axis oriented transverse to the first rotational axis; and an armrest coupled to the second armrest member.

In some embodiments, the armrest clamp is adapted to move along a length of the control handle. In some embodiments, the armrest clamp includes: a first clamp body member; and a second clamp body member, where the first clamp body member and the second clamp body member are adapted to be secured to one another about the control handle. In some embodiments, the first armrest member is rotatably coupled to the armrest clamp by way of a first fastener, and where the first rotational axis is defined by a longitudinal axis of the first fastener. In some embodiments, the first fastener includes a first male threaded member that is adapted to thread into a first female threaded hole to secure the position of the first armrest member relative to the armrest clamp. In some embodiments, the first threaded member includes a bolt and the first female threaded hole includes a female threaded hole in a body of the armrest clamp. In some embodiments, the second armrest member is rotatably coupled to the first armrest member by way of a second fastener, and where the second rotational axis is defined by a longitudinal axis of the second fastener. In some embodiments, the first armrest member or the second armrest member includes an arc-shaped guide slot, and where rotation of the second armrest member relative to the first armrest member is guided by way of a guide member that is adapted to move along the guide slot.

Figure 1:
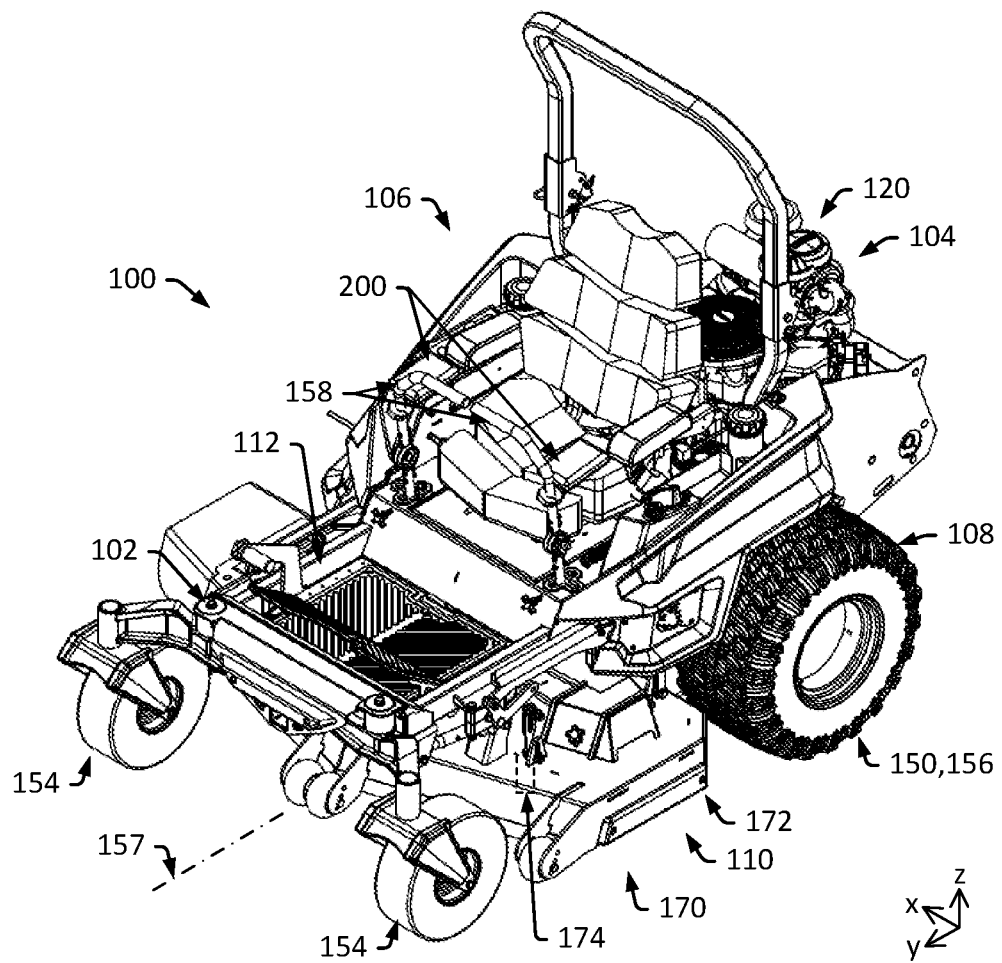
FIG. 1 is a diagram that illustrates a mower system in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION provided are embodiments of a zero-turn-radius (ZTR) riding mower arm support system (or "arm rest system"). In some embodiments, an arm rest system includes an arm support that can be attached to a control handle and support an operator's arm, wrist or hand while grasping or manipulating the control handle. For example, the arm rest system may include an arm support having a "clamp" that can be secured to an upper portion of a control handle (e.g., near a handle of the control handle) and a platform (or "pad") that can support the arm or wrist of an operator grasping the control handle. Such a configuration may enable the operator to rest the weight of her/his arm, wrist and hand on the arm support, which can help reduce operator fatigue and improve operator comfort. In some embodiments, the arm support is "adjustable." For example, the clamp used to secure the arm support may be adapted to move "up" and "down" along the control handle and to be swiveled "around" the control handle, and the pad may be coupled to the clamp in a manner that enables the pad to be tilted "forward," "backward," and "side-to-side" relative to the clamp and the control handle. Such adjustability may enable an operator to configure the pad in a position that is most comfortable to her/him. For example, an operator that prefers her/his hands to be level with an upper end of the control handle with her/his arms angled downward by about 15 degrees and her/his wrists angled inward at an angle of about 30 degrees may secure the clamp near the upper end of the control handle, and secure the pad such that it is tilted "backwards" at an angle of about 15 degrees and is tilted "sideways" at an angle of about 30 degrees. Accordingly, the adjustable nature of the arm support may allow an operator to "fine-tune" the arm support to her/his preferred position. In some embodiments, the clamp can be coupled to different styles of control handles. For example, the clamp may have an adjustable opening that can be secured about round control handles having different diameters. The adjustable nature of the clamp and the pad may enable the arm support to be used on a variety of mowers having different styles of control handles.

FIG. 1 is a diagram that illustrates a sit-on ZTR riding mower (or "mower") 100 in accordance with one or more embodiments. In some embodiments, the mower 100 includes a frame system (or "frame") 102, a power system 104, a control system 106, a drive system 108, a cutting system 110, and two ZTR riding mower arm support systems (or "arm rest systems") 200.

Referring to FIG. 1, in some embodiments, the frame system 102 is a rigid structure that supports components of the mower 100. For example, the frame system (or "frame") 102 may include members that are rigidly fastened to one another such that they do not move relative to one another. In some embodiments, the frame 102 includes a frame weldment 112. The frame weldment 112 may include a rigid metal structure formed of multiple metal members that are welded, or similarly fastened, together. Other components of the mower 100 may be coupled to the frame 102 to position them relative to the frame 102 and to one another.

In some embodiments, the power system 104 includes a motor 120. The motor 120 may supply motive power used to operate the mower 100. In some embodiments, the motor 120 includes an engine, such as an internal combustion engine (e.g., a gas-fueled engine, a diesel-fueled engine, or a natural gas-fueled engine) or an electric motor. In some embodiments, the motor 120 is coupled to the frame 102. For example, the motor 120 may be bolted, or similarly fastened, to the frame weldment 112. In some embodiments, the power generated by the motor 120 rotates (or "drives") a drive shaft of the motor 120, which can be used as motive power for other components of the mower 100. For example, the power generated by the motor 120 may drive rotation of the drive shaft, which drives circulation of drive belts that transmit motive power from the drive shaft to the drive system 108 and the cutting system 110.

In some embodiments, one or more drive pulleys are coupled to the drive shaft of the motor 120. The drive pulleys may include, for example, a pump drive pulley and a deck drive pulley. In some embodiments, the drive pulleys engage with respective drive belts that are employed to transmit motive power to other components of the mower 100. For example, the pump drive pulley may engage with a pump drive belt (or "pump belt") that is circulated to transmit motive power to the drive system 108. The deck drive pulley may engage with a deck drive belt (or "deck belt") that is circulated to transmit motive power to the cutting system 110. During operation of the mower 100, the motor 120 may be operated to rotate the drive shaft, the pump drive pulley and the deck drive pulley, which, in turn, drives circulation of the pump drive belt and circulation of the deck drive belt.

In some embodiments, the control system 106 includes controls for regulating operation of the mower 100. For example, the control system 106 may include an ignition switch (e.g., a switch operable to start or stop operation of the motor 120), a throttle control (e.g., a knob operable to regulate the operational speed of the motor 120), a blade control (e.g., a knob operable to engage or disengage the cutting system 110), a wheel brake control (e.g., a lever operable to engage or disengage a wheel brake), a deck height control (e.g., a lever to adjust a height of a cutting deck), or a user interface (e.g., a display of status information for the mower 100, such as motor hours and oil level). An operator may interact with the control system 106 to control and monitor various aspects of the operation of the mower 100.

In some embodiments, the drive system (or "propulsion system") 108 includes components for propelling (or "driving") the mower 100 across the ground. In some embodiments, the drive system 108 includes wheel assemblies (or "wheels") 150 and one or more drive units 152 that supply motive power to the wheels 150 (see, e.g., FIG. 2). For example, the drive system 108 may include right and left forward wheels (or "front wheels") 154, right and left rear wheels (or "back wheels") 156, and right and left drive units 152 operable to drive rotation of the right and left rear wheels 156, respectively. Each of the wheels 150 may include, for example, a tire coupled a wheel.

For reference, the right and left sides of the mower 100 may be defined relative to the direction that an operator is expected to be primarily facing while operating the mower 100. "Forward" may refer to the direction that an operator is expected to be primarily facing while operating the mower 100. In accordance with the coordinate system axes illustrated, "right" may refer to the positive "x" direction, "left" may refer to the negative "x" direction, "front" (or "forward") may refer to the positive "y" direction, "back" (or "rearward" or "backward") may refer to the negative "y" direction, "up" (or "upward") may refer to the positive "z" direction, and "down" (or "downward") may refer to the negative "z" direction. A longitudinal axis 157 of the mower 100 may be oriented in the "y" direction, for example, passing through or near a midpoint between the rear wheels 156 of the mower 100.

The front wheels 154 may be positioned at or near a front end of the frame system 102 to support a front portion of the mower 100. In some embodiments, the front wheels 154 are caster wheels that swivel about a vertically oriented rotational axis (e.g., a rotational axis oriented in the y-direction) in response to corresponding movements of the mower 100. The front wheels 154 may be referred to as "non-driven" wheels in that they do not receive motive power intended to propel the mower 100. The rear wheels 156 may be positioned at or near a rear end of the frame system 102 to support a rear portion of the mower 100. In some embodiments, the drive units 152 drive rotation of the rear wheels 156 to propel the mower 100. For example, each of the right and left rear wheels 156 may be coupled to a drive axle of the right and left drive units 152, respectively. Each of the drive units 152 may be selectively operable to rotate its drive axle and attached wheel 156 forward or backward (e.g., about a rotational axis oriented in the x-direction). The rear wheels 156 may be referred to as "driven" or "drive" wheels in that they receive (and are driven into rotation by) motive power intended to propel the mower 100.

In some embodiments, each of the drive units 152 is a hydraulic drive unit. For example, each of the drive units 152 may include a hydraulic pump and a hydraulic motor. The hydraulic pump may operate to circulate hydraulic fluid that drives the hydraulic motor, which drives rotation of a drive axle. In some embodiments, the hydraulic pump includes pump input pulley that is rotated by the circulation of the pump belt. The rotation of the pump input pulley may provide the motive power to pressurize and circulate the hydraulic fluid that drives the hydraulic motor and rotation of the drive axle.

In some embodiments, each of the drive units 152 transmits motive power to rotate its drive axle in response to selective operation of associated control handles (or "control arms" or "drive arms" or "control levers" or "steering levers") 158 (see, e.g., FIG. 1). For example, when a control handle 158 of a drive unit 152 is pushed forward or backward, the drive axle of the drive unit 152 (and an attached rear wheel 156) may be rotated forward or backward, respectively, about a rotational axis of the drive axle (and of the wheel 156). An operator of the mower 100 may, for example, simultaneously push both of the right and left control handles 158 about the same distance forward to drive the mower 100 forward or may vary the distance of the control handles 158 to turn the mower 100.

In some embodiments, the cutting system 110 includes components that provide for cutting (or "mowing") of grass. In some embodiments, the cutting system 110 includes a mowing deck system (or "deck system") 170. The mowing deck system 170 may include a mowing deck (or "deck") 172 that houses one or more cutting blades (or "blades") 174. During operation of the mower 100, the blades 174 may be rotated to cut (or "mow") grass under the deck 172 as the mower 100 traverses the ground. The deck 172 may be a metal housing that shields the operator and components of the mower 100 from debris, such as flying grass, dust or rocks that is generated by the rotating blades 174. In some embodiments, the cutting system 110 includes multiple blades 174. For example, the deck system 170 may include left, center and right blades 174.

In some embodiments, each of the ZTR riding mower arm support systems (or "arm rest systems") 200 are coupled to respective ones of the right and left control handles 158 to provide an "arm rest" that supports an operator's right or left arm, wrist or hand, for example, while grasping or manipulating the control handle 158. In some embodiments, each of the arm rest systems 200 includes a ZTR arm rest clamp (or "clamp") 202, a first rotatable ZTR armrest member (or "arm rest base bracket") 204, a second rotatable ZTR armrest member (or "arm rest pad bracket") 206, and a ZTR arm rest platform (or "arm rest pad") 208.

Figure 2:
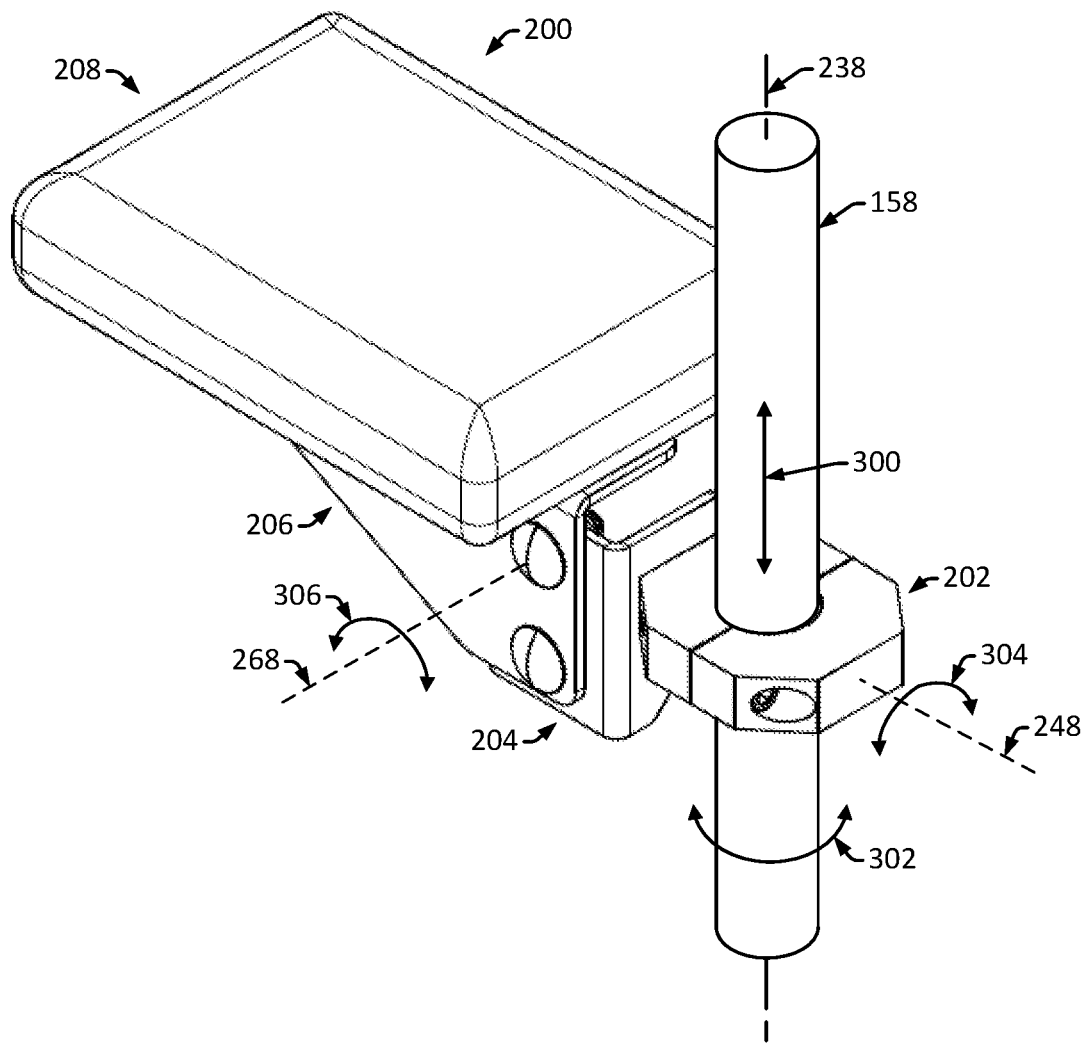
FIG. 2 is a diagram that illustrates a zero-turn-radius (ZTR) riding mower arm support system attached to a ZTR mower control handle in accordance with one or more embodiments.
Figure 3A:
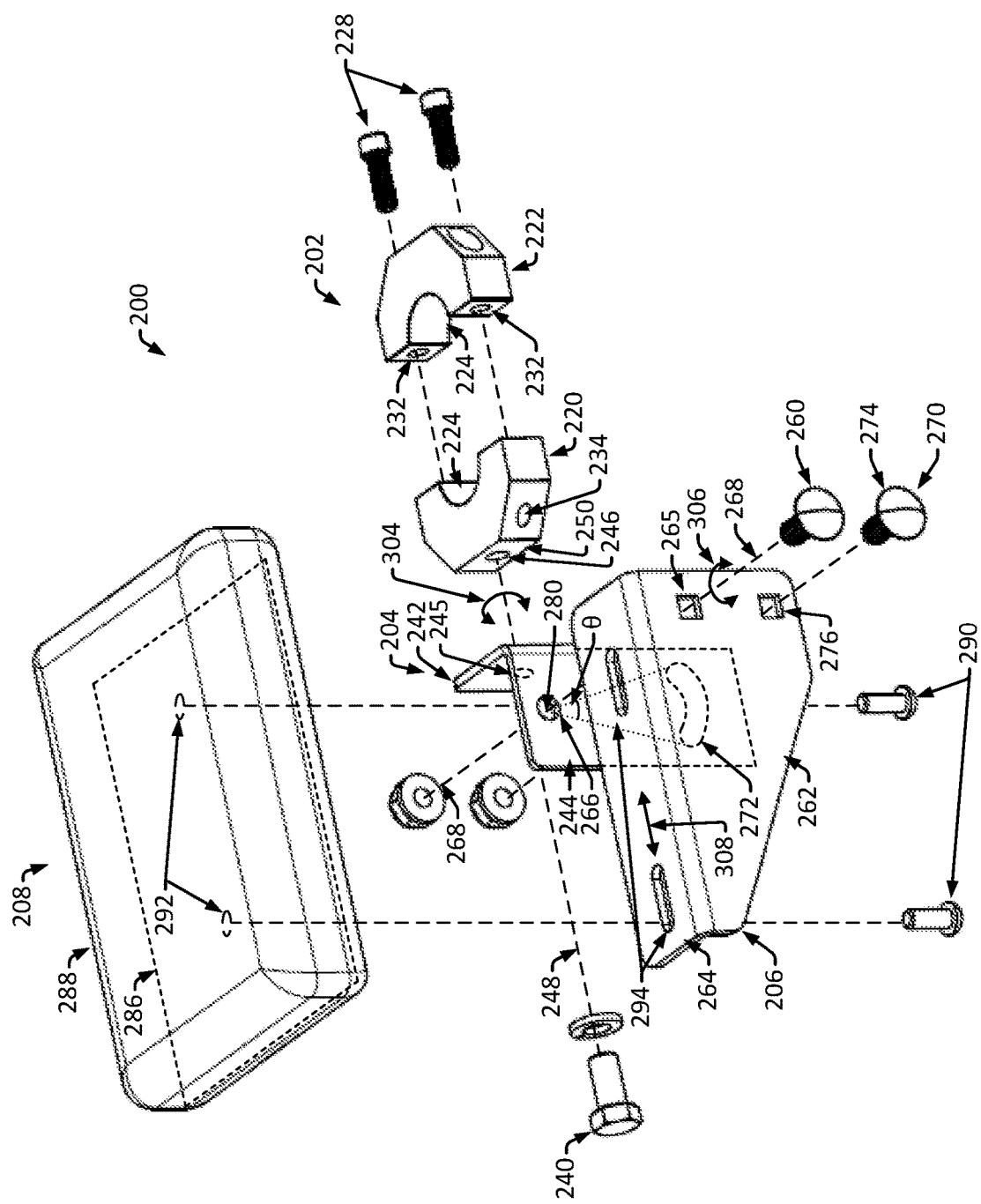
FIGS. 3A and 3B are diagrams that illustrate exploded perspective views of a ZTR riding mower arm support system in accordance with one or more embodiments.
Figure 3B:
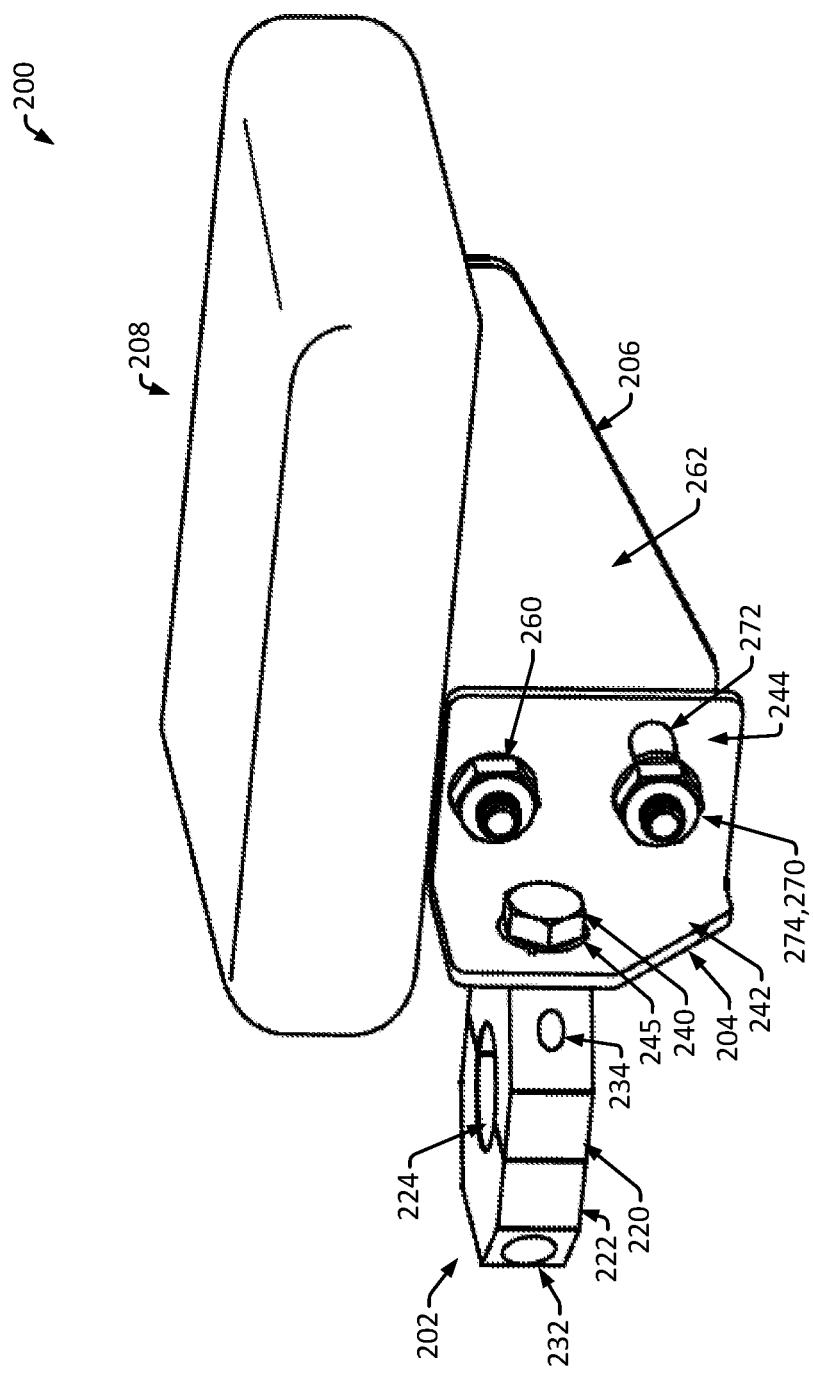
Figure 4A:
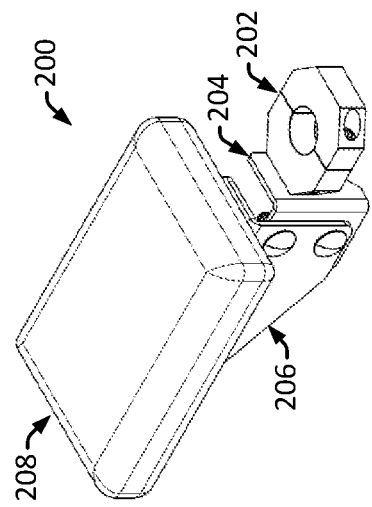
FIGS. 4A-4G are diagrams that illustrate perspective, top, right, front, bottom, left and back views of a ZTR riding mower arm support system in accordance with one or more embodiments.
Figure 4D:
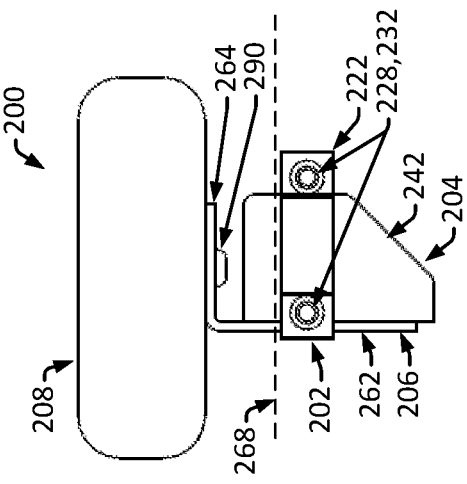
Figure 4B:
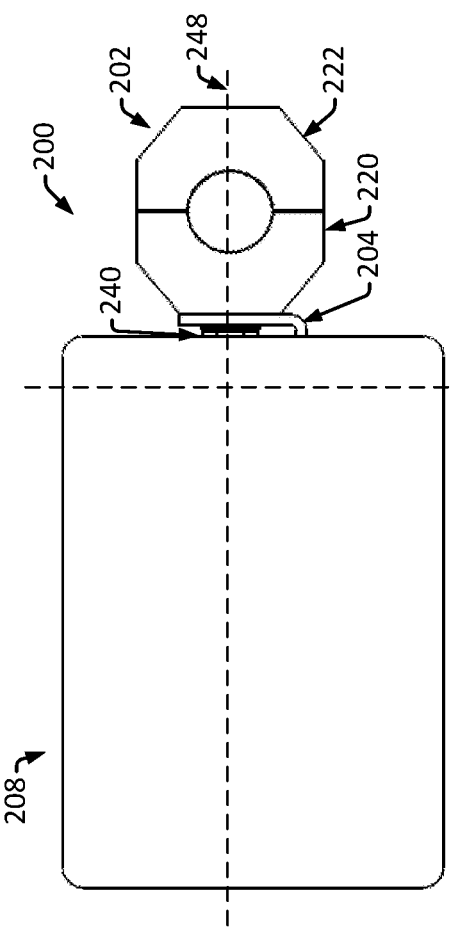
Figure 4C:
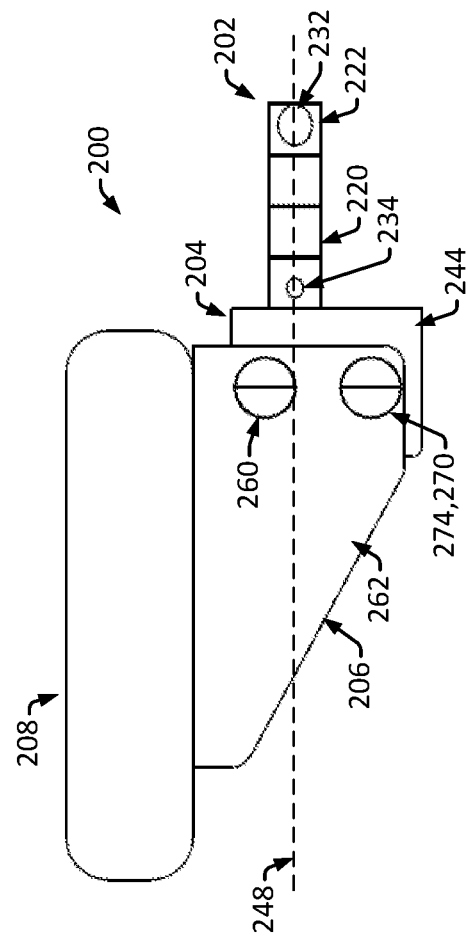
Figure 4G:
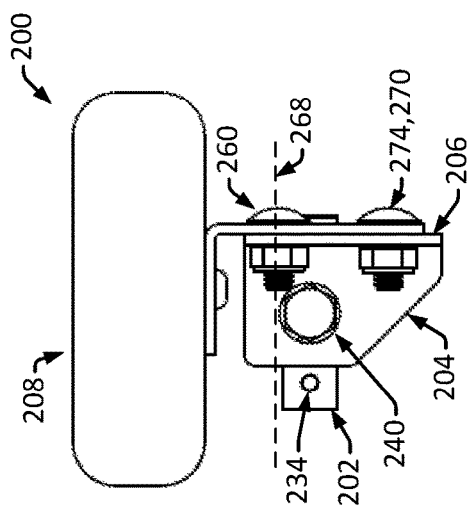
Figure 4E:
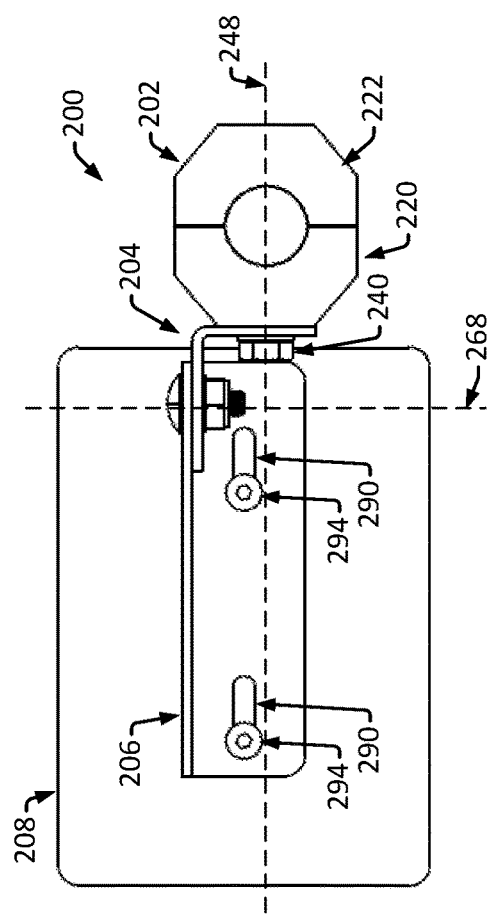
Figure 4F:
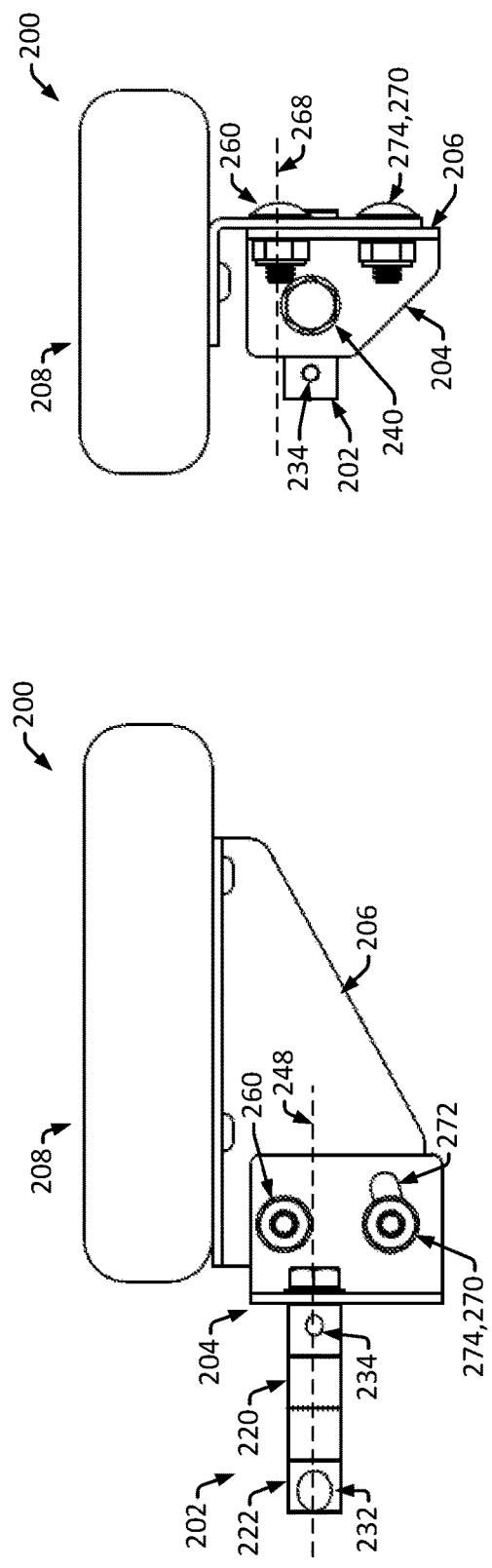

The clamp 202 may provide for securing the arm rest system 200 to a control handle 158 (see, e.g., FIG. 2). In some embodiments, the clamp 202 includes a first clamp body member 220 and a second clamp body member 222 (see, e.g., FIG. 3A). Each of the first and second clamp body members 220 and 222 may have an interior face (or "clamping face") 224 having a profile that is complementary to a shape of a control arm 158. For example, the interior surfaces 224 may have about a 1 inch (in) rounded (e.g., semi-circular) concave profile that is the same or similar to about a 1 in rounded (e.g., circular) convex profile of an exterior surface of a cylindrically shaped tube 226 forming the control arm 158. In some embodiments, the clamp 202 includes clamp body fasteners 228 that are used to couple the first and second clamp body members 220 and 222 to one another. For example, the clamp body fasteners 228 may be bolts that extend through through-holes 232 of the second clamp body member 222 and into complementary threaded holes 234 of the first clamp body member 220. During use, the first and second clamp body members 220 may be disposed on opposite sides of the control handle 158 and may be secured to one another by way of the clamp body fasteners 228 to secure (or "clamp") the first and second clamp body members 220 to the control handle 158.

The adjustable nature of the clamp 202 may enable adjustment of the overall position of the arm rest system 200 on the control handle 158. For example, the clamp body fasteners 228 may be loosened to reduce the friction (or "grip") of the clamp 202 on the control handle 158 to allow the clamp 202 (and the other components of the arm rest system 200) to be moved (or "slid") "up" and "down" along the length of the control handle 158 (e.g., parallel to a longitudinal axis 238 of the control handle 158, as illustrated by arrow 300) and to allow the clamp 202 to be rotated (or "swiveled") about the control handle 158 (e.g., about the longitudinal axis 238 of the control handle 158, as illustrated by arrow 302) (see, e.g., FIGS. 2 and 3A). Once the clamp 202 (and the arm rest system 200) is moved into a desirable position, the clamp body fasteners 228 may be tightened to increase the friction (or "grip") of the clamp 202 on the control handle 158 to secure the clamp 202 (and the arm rest system 200) in position about and relative to the control handle 158.

The arm rest base bracket 204 may provide for securing of the arm rest pad bracket 206 to the clamp 202. In some embodiments, the arm rest base bracket 204 is rotatably coupled to the clamp 202 by way of a first fastener (or "arm rest base bracket fastener") 240. For example, the arm rest base bracket 204 may include an elongated "L-shaped" member having a first elongated planar member 242 and a second elongated planar member 244 oriented perpendicular to the first elongated planar member 242. The first elongated planar member 242 may have a through-hole 245, and the first fastener 240 may be a bolt that is disposed through the through-hole 245 and into a complementary threaded hole 246 in the first clamp body member 220 of the clamp 202. During use, the first fastener 240 may be passed through the through-hole 245 and be tightened into the complementary threaded hole 246 to secure the arm rest base bracket 204 to the clamp 202.

The adjustable nature of the arm rest base bracket 204 may enable adjustment of the orientation of the arm rest base bracket 204 (and the arm rest pad bracket 206 and the arm rest pad 208) relative to the clamp 202. For example, the first fastener 240 may be loosened to allow the arm rest base bracket 204 to rotate (or "swivel") about the first fastener 240 (e.g., about a longitudinal axis 248 of the first fastener 240, as illustrated by arrow 304) (see, e.g., FIGS. 2 and 3A). Once the arm rest base bracket 204 is moved into a desirable position, the first fastener 240 may be tightened to secure the first elongated planar member 242 of the arm rest base bracket 204 against a complementary face 250 of the clamp 202 to secure the arm rest base bracket 204 in position relative to the clamp 202. Accordingly, the longitudinal axis 248 of the first fastener 240 may define a first rotational axis about which the arm rest base bracket 204 can be rotated. The longitudinal axis 248 of the first fastener 240 (and the corresponding first rotational axis) may be oriented transverse to (e.g., perpendicular to) the longitudinal axis 238 of the control handle 158.

The arm rest pad bracket 206 may provide for securing of the arm rest pad 208 to the arm rest base bracket 204. In some embodiments, the arm rest pad bracket 206 is rotatably coupled to the arm rest base bracket 204 by way of a second fastener (or "arm rest pad bracket fastener") 260. For example, the arm rest pad bracket 206 may include an elongated "L-shaped" member having a first elongated planar member 262 and a second elongated planar member 264 oriented perpendicular to the first elongated planar member 262. The first elongated planar member 262 of the arm rest pad bracket 206 and the second elongated planar member 244 of the arm rest base bracket 204 may each have respective second fastener through-holes 265 and 266. The second fastener 260 may be a bolt and nut assembly that is disposed through the through-holes 265 and 266. During use, the second fastener 260 may be passed through the through-holes 265 and 266 and tightened (e.g., the nut may be tightened onto a stud of the bolt extending through the through-holes 265 and 266) to secure the arm rest pad bracket 206 to the arm rest base bracket 204.

The adjustable nature of the arm rest pad bracket 206 may enable adjustment of the orientation of the arm rest pad bracket 206 (and the arm rest pad 208) relative to the arm rest base bracket 204. For example, the second fastener 260 may be loosened to allow the arm rest pad bracket 206 to rotate (or "swivel") about the second fastener 260 (e.g., about a longitudinal axis 268 of the second fastener 260, as illustrated by arrow 306) (see, e.g., FIGS. 2 and 3A). Once the arm rest pad bracket 206 is moved into a desirable position, the second fastener 260 may be tightened to secure a face of the first elongated planar member 262 of the arm rest pad bracket 206 against a face of the second elongated planar member 244 of the arm rest base bracket 204 to secure the arm rest pad bracket 206 in position relative to the arm rest base bracket 204. Accordingly, the longitudinal axis 268 of the second fastener 260 may define a second rotational axis about which the arm rest pad bracket 206 can be rotated. The longitudinal axis 268 of the second fastener 260 (and the corresponding second rotational axis) may be oriented transverse to (e.g., perpendicular to) the longitudinal axis 248 of the first fastener 240 (and the corresponding first rotational axis).

In some embodiments, the rotation of the arm rest pad bracket 206 relative to the arm rest base bracket 204 is guided by a guide assembly 270. The guide assembly 270 may include a guide slot 272 (e.g., formed in one of the first elongated planar member 262 of the arm rest pad bracket 206 and the second elongated planar member 244 of the arm rest base bracket 204) and a complementary guide pin 274 that is positioned to extend into and move along the guide slot 272 as the arm rest pad bracket 206 is rotated. For example, the second elongated planar member 244 of the arm rest base bracket 204 may include an arc-shaped guide slot 272 and the first elongated planar member 262 of the arm rest pad bracket 206 may have a complementary guide pin through-hole 276. The guide pin 274 may include a bolt and nut assembly disposed through the guide pin through-hole 276 and the guide slot 272. During use, an elongated member of the guide pin 274 (e.g., stud portion of a bolt) may extend through the guide pin hole 276 and the guide slot 272. With the second fastener 260 and the guide pin 274 loosened, the arm rest pad bracket 206 may be rotated (or "swiveled") about the second fastener 260 (e.g., about the longitudinal axis 268 of the second fastener 260, as illustrated by arrow 306) (see, e.g., FIGS. 2 and 3A). As the arm rest pad bracket 206 is rotated about the second fastener 260, the elongated member of the guide pin 274 (e.g., the stud portion of the bolt) may move (or "slide") along the guide slot 272. Once the arm rest pad bracket 206 is moved into a desirable position, the second fastener 260 and the guide pin 274 may be tightened to secure a face of the first elongated planar member 262 of the arm rest pad bracket 206 against a face of the second elongated planar member 244 of the arm rest base bracket 204 to secure the arm rest pad bracket 206 in position relative to the arm rest base bracket 204. The tightening of both of the second fastener 260 and the guide pin 274 may provide an enhanced "clamping" force that helps to maintain the position of the arm rest pad bracket 206 relative to the arm rest base bracket 204.

In some embodiments, the guide slot 272 limits rotation (or "swiveling") of the arm rest pad bracket 206 relative to the arm rest base bracket 204. For example, if the arm rest pad bracket 206 is rotated about the second fastener 260 by a sizable amount, the guide pin 274 will abut an end of the guide slot 272, which will inhibit further rotation of the arm rest pad bracket 206 about the second fastener 260. Limiting the rotation may be useful for maintaining a reasonable positioning and orientation of the arm rest pad 208. For example, if the second fastener 260 (and the guide pin 274) become loose during use, the arm rest pad bracket 206 may be inhibited from rotating "too far downward" about the second fastener 260. For example, the arm rest pad 208 may maintain at least a somewhat horizontal orientation that is desirable for supporting the operator's arm, wrist or hand while grasping or manipulating the control handle 158, as opposed to continuing to rotate downward such that the arm rest pad 208 hangs in a vertical orientation.

In some embodiments, the guide slot 272 of a member has arced shaped having an arc center coincident with the hole of the member through which second fastener 260 is passed, and an arc angle measure ($\theta$) that corresponds to a range of rotation (or "adjustment") provided for the arm rest pad bracket 206. For example, the guide slot 272 of the second elongated planar member 244 of the arm rest base bracket 204 may be an arc-shaped slot having an arc center 280 that is coincident with the center of the second fastener hole 266 of the second elongated planar member 244 of the arm rest base bracket 204 (through which the second fastener 260 is passed), and having an arc angle measure ($\theta$) that corresponds to a range of rotation (or "adjustment") provided for the arm rest pad bracket 206. The arc angle measure ($\theta$) may be in the range of about 5-180 degrees (e.g., the arc angle measure ($\theta$) may be about 44 degrees).

In some embodiments, the arm rest pad 208 defines a surface that can support an operator's arm, wrist or hand while grasping or manipulating the control handle 158. For example, the arm rest pad 208 may include a rigid planar pad base member 286 (e.g., a metal plate) covered with a cushioned pad 288. The cushioned pad 288 may be, for example, foam padding covered in a protective material, such as vinyl. In some embodiments, the arm rest pad 208 is secured to the arm rest pad bracket 206 by way of arm rest pad fasteners 290. For example, the arm rest pad 208 may include female threaded holes 292 embedded into an underside of the rigid planar member 286 of the arm rest pad 208, and the arm rest pad 208 may be secured to the arm rest pad bracket 206 by way of bolt type arm rest pad fasteners 290 that are passed through through-holes 294 in the second elongated planar member 264 of the arm rest pad bracket 206 and are threaded into the holes 292. In such an embodiment, the arm rest pad 208 may be removed (e.g., for cleaning or replacement) by loosening and removal of the arm rest pad fasteners 290. In some embodiments, the through-holes 294 in the second elongated planar member 264 of the arm rest pad bracket 206 include elongated slots. Such slots may provide for adjustment of the position of the arm rest pad 208 relative to the arm rest pad bracket 206. For example, with the arm rest pad fasteners 290 loosened, the arm rest pad 208 may be moved (or "slid") relative to the arm rest pad bracket 206 (e.g., in a direction parallel to the longitudinal axis 248 of the first fastener 240 and the corresponding first rotational axis, as illustrated by arrow 308) (see, e.g., FIGS. 2 and 3A). Once the arm rest pad 208 is moved into a desirable position, the arm rest pad fasteners 290 may be tightened to secure the arm rest pad 208 in position relative to the arm rest pad bracket 206.

In some embodiments, the second elongated planar member 264 or the arm rest pad 208 may have an orientation that is generally parallel to the longitudinal axis 248 of the first fastener 240 (and the corresponding first rotational axis) and to the longitudinal axis 268 of the second fastener 260 (and the corresponding second rotational axis). For example, the second elongated planar member 264 or the rigid planar member 286 may each define a plane that is parallel to the longitudinal axis 248 of the first fastener 240 (and the corresponding first rotational axis) and to the longitudinal axis 268 of the second fastener 260 (and the corresponding second rotational axis).

What is claimed is:

1. A zero-turn radius (ZTR) riding mower armrest system, comprising:
   an armrest clamp configured to couple to a control handle of a zero-turn radius (ZTR) riding mower;
   a first armrest member rotatably coupled to the armrest clamp, wherein the first armrest member is configured to rotate relative to the armrest clamp about a first rotational axis that is oriented perpendicular to a longitudinal axis of the control handle, and wherein the first armrest member is configured to be secured to fix a position of the first armrest member relative to the armrest clamp;
   a second armrest member rotatably coupled to the first armrest member, wherein the second armrest member is configured to rotate relative to the first armrest member about a second rotational axis that is oriented perpendicular to the first rotational axis, the second armrest member and the second rotational axis configured to rotate about the first rotational axis such that the second rotational axis is configured to be oriented perpendicular to the longitudinal axis of the control handle, and wherein the second armrest member is configured to be secured to fix a position of the second armrest member relative to the first armrest member; and
   an armrest coupled to the second armrest member, the armrest comprising a supporting surface configured to be oriented in a first direction when the second rotational axis is oriented perpendicular to the longitudinal axis of the control handle and the longitudinal axis of the control handle is oriented in a second direction that is perpendicular to the first direction.

2. The ZTR riding mower armrest system of claim 1, wherein securing the first armrest member to fix a position of the first armrest member relative to the armrest clamp and securing the second armrest member to fix a position of the second armrest member relative to the first armrest member is configured to fix a position of the armrest relative to the armrest clamp and the control handle of the ZTR riding mower.

3. The ZTR riding mower armrest system of claim 1, wherein the armrest clamp is configured to move along a length of the control handle to provide for adjustment of positioning of the ZTR riding mower armrest system on the control handle.

4. The ZTR riding mower armrest system of claim 1, wherein the first armrest member is rotatably coupled to the armrest clamp by way of a first fastener.

5. The ZTR riding mower armrest system of claim 4, wherein the first fastener is configured to secure the first armrest member to fix a position of the first armrest member relative to the ZTR armrest clamp.

6. The ZTR riding mower armrest system of claim 4, wherein the first rotational axis is defined by a longitudinal axis of the first fastener.

7. The ZTR riding mower armrest system of claim 1, wherein the second armrest member is rotatably coupled to the first armrest member by way of a second fastener.

8. The ZTR riding mower armrest system of claim 7, wherein the second fastener is configured to secure the second armrest member to fix a position of the second armrest member relative to the first armrest member.

9. The ZTR riding mower armrest system of claim 7, wherein the second rotational axis is defined by a longitudinal axis of the second fastener.

10. The ZTR riding mower armrest system of claim 1, wherein the supporting surface of the armrest is configured to support an arm, wrist, or hand of a user while grasping or manipulating the control handle.

11. The ZTR riding mower armrest system of claim 1, wherein the first armrest member comprises an arc-shaped guide slot, the arc-shaped guide slot having an arc center coincident with the second rotational axis, and wherein the second armrest member comprises a guide pin that is configured to engage the guide slot, wherein engagement of the guide pin with the guide slot is configured to limit rotation of the second armrest member about the second rotational axis to an arc angle of the guide slot to facilitate maintaining the supporting surface of the armrest in a position configured to support an arm, wrist, or hand of a user while grasping or manipulating the control handle.

12. The ZTR riding mower armrest system of claim 1, wherein the first direction is a horizontal direction and the second direction is a vertical direction.

13. A zero-turn radius (ZTR) riding mower armrest system, comprising:
    a ZTR armrest clamp configured to couple to a control handle of a ZTR riding mower;
    a first rotatable ZTR armrest member rotatably coupled to the ZTR armrest clamp, wherein the first rotatable ZTR armrest member is configured to rotate relative to the ZTR armrest clamp about a first rotational axis oriented perpendicular to a longitudinal axis of the control handle, and the first rotatable ZTR armrest member is configured to be secured to fix a position of the first rotatable ZTR armrest member relative to the ZTR armrest clamp;

a second rotatable ZTR armrest member rotatably coupled to the first rotatable ZTR armrest member, wherein the second rotatable ZTR armrest member is configured to rotate relative to the first rotatable ZTR armrest member about a second rotational axis oriented perpendicular to the first rotational axis, the second rotatable ZTR armrest member and the second rotational axis configured to rotate about the first rotational axis such that the second rotational axis is configured to be oriented perpendicular to the longitudinal axis of the control handle, and the second rotatable ZTR armrest member is configured to be secured to fix a position of the second rotatable ZTR armrest member relative to the first rotatable ZTR armrest member; and a ZTR armrest pad coupled to the second rotatable ZTR armrest member, the ZTR armrest pad comprising a supporting surface configured to be oriented in a first direction when the second rotational axis is oriented perpendicular to the longitudinal axis of the control handle and the longitudinal axis of the control handle is oriented in a second direction that is perpendicular to the first direction.

14. The ZTR riding mower armrest system of claim 13, wherein securing the first rotatable ZTR armrest member to fix a position of the first rotatable ZTR armrest member relative to the ZTR armrest clamp and securing the second rotatable ZTR armrest member to fix a position of the second rotatable ZTR armrest member relative to the first rotatable ZTR armrest member is configured to fix a position of the ZTR armrest pad relative to the ZTR armrest clamp and the control handle of the ZTR riding mower.

15. The ZTR riding mower armrest system of claim 13, wherein the ZTR armrest clamp is configured to move along a length of the control handle to provide for adjustment of positioning of the ZTR riding mower armrest system on the control handle.

16. The ZTR riding mower armrest system of claim 13, wherein the first rotatable ZTR armrest member is rotatably coupled to the ZTR armrest clamp by way of a first fastener.

17. The ZTR riding mower armrest system of claim 16, wherein the first fastener is configured to secure the first rotatable ZTR armrest member to fix a position of the first rotatable ZTR armrest member relative to the ZTR armrest clamp.

18. The ZTR riding mower armrest system of claim 16, wherein the first rotational axis is defined by a longitudinal axis of the first fastener.

19. The ZTR riding mower armrest system of claim 13, wherein the second rotatable ZTR armrest member is rotatably coupled to the first rotatable ZTR armrest member by way of a second fastener.

20. The ZTR riding mower armrest system of claim 19, wherein the second fastener is configured to secure the second rotatable ZTR armrest member to fix a position of the second rotatable ZTR armrest member relative to the first rotatable ZTR armrest member.

21. The ZTR riding mower armrest system of claim 19, wherein the second rotational axis is defined by a longitudinal axis of the second fastener.

22. A riding mower armrest system, comprising:
an armrest clamp configured to couple to a control handle of a riding mower;
a first armrest member rotatably coupled to the armrest clamp, wherein the first armrest member is configured to rotate about a first rotational axis oriented perpendicular to a longitudinal axis of the control handle and the first armrest member is configured to be secured to fix a position of the first armrest member relative to the armrest clamp;
a second armrest member rotatably coupled to the first armrest member, wherein the second armrest member is configured to rotate about a second rotational axis oriented perpendicular to the first rotational axis, the second armrest member and the second rotational axis configured to rotate about the first rotational axis such that the second rotational axis is configured to be oriented perpendicular to the longitudinal axis of the control handle, and the second armrest member is configured to be secured to fix a position of the second armrest member relative to the first armrest member; and
an armrest coupled to the second armrest member, the armrest comprising a supporting surface configured to be oriented in a first direction when the second rotational axis is oriented perpendicular to the longitudinal axis of the control handle and the longitudinal axis of the control handle is oriented in a second direction that is perpendicular to the first direction.

23. The riding mower armrest system of claim 22, wherein securing the first armrest member to fix a position of the first armrest member relative to the armrest clamp and securing the second armrest member to fix a position of the second armrest member relative to the first armrest member is configured to fix a position of the armrest relative to the armrest clamp and the control handle of the riding mower.

24. The riding mower armrest system of claim 22, wherein the armrest clamp is configured to move along a length of the control handle.

25. The riding mower armrest system of claim 22, wherein the first armrest member is rotatably coupled to the armrest clamp by way of a first fastener.

26. The riding mower armrest system of claim 25, wherein the first fastener is configured to secure the first armrest member to fix a position of the first armrest member relative to the armrest clamp.

27. The riding mower armrest system of claim 25, wherein the first rotational axis is defined by a longitudinal axis of the first fastener.

28. The riding mower armrest system of claim 22, wherein the second armrest member is rotatably coupled to the first armrest member by way of a second fastener.

29. The riding mower armrest system of claim 28, wherein the second fastener is configured to secure the second armrest member to fix a position of the second armrest member relative to the first armrest member.

30. The riding mower armrest system of claim 28, wherein the second rotational axis is defined by a longitudinal axis of the second fastener.

* * * * *